_United States Patent Office_ 3,117,855
Patented Jan. 14, 1964

3,117,855
HERBICIDAL N-SUBSTITUTED ALPHA,ALPHA-DIPHENYLACETAMIDES
Sidney B. Richter, Chicago, Ill., assignor to Velsicol Chemical Corporation, Chicago, Ill., a corporation of Illinois
No Drawing. Filed Dec. 20, 1961, Ser. No. 160,927
18 Claims. (Cl. 71—2.6)

This invention relates to the production of new herbicidal compositions of matter. More specifically, this invention relates to the control of weeds with new chemical compounds of the general formula

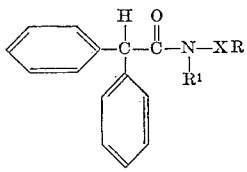

in which X is oxygen or sulfur, R is an unsubstituted hydrocarbon radical of from one to four carbon atoms, and $R^1$ is hydrogen or an unsubstituted hydrocarbon radical of from one to four carbon atoms.

The new herbicidal compounds of this invention can be prepared by the reaction of diphenylacetyl chloride with the appropriate substituted amine $HN(R^1)(XR)$, in which X, R, and $R^1$ are as defined above. Suitable amines $HN(R^1)(OR)$ can be prepared, for example, by the reduction of the corresponding oximes as described by Jones and Major, J. Am. Chem. Soc., vol. 52, pp. 669–79 (1930). Amines of the type $HN(R^1)(SR)$ have been disclosed in United States Patent 2,877,749, granted March 17, 1959, and can be prepared, for example, by treating a sulfenyl halide with an equimolar amount of an amine in the presence of an equimolar amount of aqueous NaOH as shown in United States Patent 2,520,400, granted August 29, 1950.

The substituted amine can be used conveniently in the form of one of its acid salts, such as the hydrochloride or sulfate, which will often be soluble in water. The free amine can be released in the reaction by the addition of a mild base, such as sodium carbonate, potassium carbonate, or the like. Although equimolecular proportions of the diphenylacetyl chloride and the substituted amine can be used, it is preferred that an excess of the amine be employed. An inert solvent such as benzene or other aromatic hydrocarbons can be added to facilitate the reaction if desired. Frequently the reaction will take place satisfactorily by shaking the reactants in such a solvent system at room temperature, but the reaction mixture can also be heated to promote the reaction if necessary. Temperatures below about the normal reflux temperature of the reaction mixture are preferred. Normally the reaction is carried out at atmospheric pressure, but sub- or superatmospheric pressures can also be employed.

The reaction may be complete in less than one hour, but frequently several hours of reaction time will be required. The product can be isolated, for example, by removing the solvent from the organic layer of the reaction mixture. While the product which is obtained in this manner is often sufficiently pure for pesticidal purposes as such, it can be purified by recrystallization, distillation, chromatography, or other techniques known to the art.

The manner in which the new compounds of this invention can be prepared is illustrated in the following examples. All temperatures are in degrees centigrade.

EXAMPLE 1.—_Preparation of N-Methoxy-N-Methyl-Alpha,Alpha-Diphenylacetamide_

Finely powdered diphenylacetyl chloride (11.5 g.) was shaken with a solution of 7.0 g. potassium carbonate and 5 g. of O,N-dimethyl-hydroxylamine hydrochloride in 50 ml. of cold water. The mixture was allowed to stand at room temperature for 0.5 hour, 50 ml. of benzene was added and the mixture was shaken vigorously until effervescence ceased. Some additional potassium carbonate was added. The precipitated solid was filtered, washed with benzene, and air-dried. The benzene layer from the reaction mixture was washed free of alkali with water, dried, and evaporated. The residue (12.2 g.) from the benzene solution and the precipitated solid (1.2 g.) were combined to give a 13.4 g. yield of N-methoxy-N-methyl-alpha,alpha-diphenylacetamide, M.P. 107–108.5°. A portion of the product was dissolved in hot benzene, diluted with heptane, and cooled to give crystals which when dried melted at 108°.

A wide variety of other useful new compounds which fall within the scope of this invention can be prepared in a similar manner. In the following examples, the particular substituted amines which can be used in reactions with diphenylacetyl chloride (designated for brevity as DC) to yield the named compounds of this invention are given:

_Example 2_

O - methylhydroxylamine+DC=N - methoxy - alpha,alpha-diphenylacetamide.

_Example 3_

S - methylmercaptylamine+DC=N - (methylmercapto)-alpha-alpha-diphenylacetamide.

_Example 4_

N - (methylmercapto)methylamine+DC=N - (methylmercapto) - N - methyl - alpha,alpha,diphenylacetamide.

_Example 5_

N - methoxyethylamine+DC=N - methoxy - N - ethyl-alpha,alpha-diphenylacetamide.

_Example 6_

N - methoxyisopropylamine+DC=N - methoxy - N - isopropyl-alpha,alpha-diphenylacetamide.

_Example 7_

N - methoxyallylamine+DC=N - methoxy - N - allyl-alpha,alpha-diphenylacetamide.

_Example 8_

N - (methylmercapto)ethylamine+DC=N - (methylmercapto) - N - ethyl - alpha,alpha - diphenylacetamide.

_Example 9_

N - (methylmercapto)isopropylamine+DC=N-(methylmercapto)-N-isopropyl-alpha,alpha-diphenylacetamide.

_Example 10_

N - (methylmercapto)allylamine+DC=N - (methylmercapto)-N-allyl-alpha,alpha-diphenylacetamide.

_Example 11_

N - isopropoxymethylamine+DC=N - isopropoxy - N-methyl-alpha,alpha-diphenyl-acetamide.

_Example 12_

N - isopropoxyisopropylamine+DC=N - isopropoxy-N-isopropyl-alpha,alpha-diphenylacetamide.

_Example 13_

N - isopropoxyallylamine+DC=N - isopropoxy - N-allyl-alpha,alpha-diphenyl-acetamide.

_Example 14_

N - butylmethylamine+DC=N - butyl - N - methyl-alpha,alpha-diphenyl-acetamide.

Example 15

N - butylisopropylamine+DC=N - butyl - N - isopropyl-alpha,alpha-diphenylacetamide.

Example 16

N - methoxybutylamine+DC=N - methoxy - N - butyl-alpha,alpha-diphenylacetamide.

Example 17

N - methoxy - iso - butylamine+DC=N - methoxy - N- iso-butyl-alpha,alpha-diphenylacetamide.

For practical use as pesticides, the compounds of this invention are generally incorporated into pesticidal compositions which comprise an inert carrier and a pesticidally toxic amount of such a compound. Such pesticidal compositions, which are usually known in the art as formulations, enable the active compound to be applied conveniently to the site of the pest infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, gypsum, calcium carbonate, dolomite, pyrophyllite, pumicite, ground walnut shell, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which man be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid pesticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixtures of nonionic with anionic surface-active agents. A typical emulsifiable concentrate formulation is illustrated in the following example, in which the quantities are in parts by weight.

Example 18

|  | Percent |
| --- | --- |
| Product of Example I | 25 |
| Aromatic polyethylene glycol ether emulsifier | 5 |
| Xylene | 70 |

The emulsifiable concentrate can be prepared by dissolving the product of Example I in the xylene, gentle heating being used if necessary. The emulsifier is then added, and the mixture is stirred until homogeneous. The resulting concentrate can be diluted with water to give the desired concentration of the active compound for application to the site of the pest infestation.

The pesticides of this invention can be applied in any manner recognized by the art. The concentration of the new compounds of this invention in the pesticidal compositions will vary greatly with the type of formulation and the purpose for which it is designed, but generally the pesticidal compositions will comprise from about 0.05 to about 95 percent by weight of the active compounds of this invention. The compositions can also comprise such additional substances as other pesticides, spreaders, adhesives, stickers, fertilizers, activators, synergists and the like.

Weeds are undesirable plants in their growing where they are not wanted, having no economic value, and interfering with the production of cultivated crops or with the welfare of livestock. Many types of weeds are known, including summer annuals such as pigweed, lamb's-quarters, ragweed, yellow and green foxtail, and crabgrass; winter annuals such as chickweed, wild mustard, shepherd's-purse, and penny-cress; biennials such as wild carrot and great burdock; and perennials such as quackgrass, Johnson grass, Canada thistle, hedge bindweed, Bermuda grass, and sheep sorrel. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of only a few ounces of an active compound per acre may be sufficient for good control of a light infestation of weeds growing under adverse conditions, the application of more than one pound of active compound per acre may be required for good control of a dense infestation of hardy weeds growing under favorable conditions.

The herbicidal toxicity of the new compounds of this invention can be illustrated by any of the established testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of the compounds of this invention. Comparable pre-planting or post-emergence tests can also be used.

I claim:

1. A compound of the formula

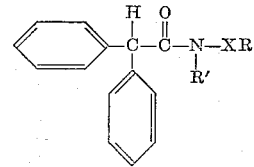

in which X is selected from the group consisting of oxygen and sulfur, R is selected from the group consisting of alkyl of one to four carbon atoms and alkenyl of one to four carbon atoms, and R' is selected from the group consisting of hydrogen, alkyl of one to four carbon atoms, and alkenyl of one to four carbon atoms.

2. N-methoxy-alpha,alpha-diphenylacetamide.
3. N-methoxy-N - methyl - alpha,alpha - diphenylacetamide.
4. N - (methylmercapto) - alpha,alpha - diphenylacetamide.
5. N-(methylmercapto)-N-methyl-alpha,alpha - diphenylacetamide.
6. N-methoxy-N-ethyl-alpha,alpha-diphenylacetamide.
7. N-methoxy-N-isopropyl-alpha,alpha - diphenylacetamide.
8. N-methoxy-N-allyl-alpha,alpha-diphenylacetamide.

9. N-(methylmercapto)-N-ethyl - alpha,alpha - diphenylacetamide.
10. N-(methylmercapto)-N-isopropyl-alpha,alpha - diphenylacetamide.
11. N-(methylmercapto)-N-allyl-alpha,alpha - diphenylacetamide.
12. N-isopropoxy-N-methyl-alpha,alpha - diphenylacetamide.
13. N-isopropoxy-N-isopropyl - alpha,alpha - diphenylacetamide.
14. N-isopropoxy-N-allyl - alpha,alpha - diphenylacetamide.
15. N-butoxy-N-methyl-alpha,alpha-diphenylacetamide.
16. N-butoxy-N-isopropyl - alpha,alpha - diphenylacetamide.
17. A herbicidal composition comprising an inert carrier and from about 0.05 to about 95 percent by weight of a compound of claim 1.
18. A method for the control of weeds which comprises contacting said weeds with a herbicidal composition comprising an inert carrier and as the essential active ingredient, in a quantity which is herbicidally toxic to said weeds, a compound of the formula

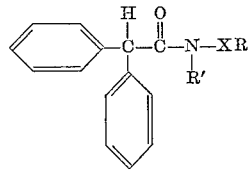

in which X is selected from the group consisting of oxygen and sulfur, R is selected from the group consisting of alkyl of one to four carbon atoms and alkenyl of one to four carbon atoms, and R' is selected from the group consisting of hydrogen, alkyl of one to four carbon atoms, and alkenyl of one to four carbon atoms.

No references cited.